(12) United States Patent
Liu et al.

(10) Patent No.: US 10,301,190 B2
(45) Date of Patent: May 28, 2019

(54) PRESSURE CONTROLLED GAS FLOTATION

(71) Applicant: Cameron Solutions, Inc., Houston, TX (US)

(72) Inventors: Wenjun Liu, Wayne, PA (US); Luis Eduardo Caires-Fernandez, Cypress, TX (US); Daniel E. Shannon, Houston, TX (US)

(73) Assignee: CAMERON SOLUTIONS, INC., Houston, TX (US)

( * ) Notice: Subject to any disclaimer, the term of this patent is extended or adjusted under 35 U.S.C. 154(b) by 35 days.

(21) Appl. No.: 15/072,619

(22) Filed: Mar. 17, 2016

(65) Prior Publication Data

US 2017/0267548 A1 Sep. 21, 2017

(51) Int. Cl.
| | |
|---|---|
| *C02F 1/24* | (2006.01) |
| *B01D 17/035* | (2006.01) |
| *B01D 17/02* | (2006.01) |
| *B01D 17/04* | (2006.01) |
| *C02F 1/00* | (2006.01) |
| *B01D 17/12* | (2006.01) |
| *B03D 1/02* | (2006.01) |

(Continued)

(52) U.S. Cl.
CPC ............ *C02F 1/24* (2013.01); *B01D 17/0205* (2013.01); *B01D 17/0217* (2013.01); *B01D 17/045* (2013.01); *B01D 17/12* (2013.01); *B03D 1/028* (2013.01); *B03D 1/04* (2013.01); *B03D 1/1431* (2013.01); *C02F 1/008* (2013.01); *C02F 1/20* (2013.01); *C02F 1/40* (2013.01); *C02F 1/38* (2013.01); *C02F 2101/32* (2013.01); *C02F 2209/03* (2013.01); *C02F 2301/08* (2013.01)

(58) Field of Classification Search
USPC ........................................................ 210/703
See application file for complete search history.

(56) References Cited

U.S. PATENT DOCUMENTS

| | | | | |
|---|---|---|---|---|
| 4,976,863 A | * | 12/1990 | Stearns | ..................... C02F 1/24 |
| | | | | 210/608 |
| 6,238,569 B1 | | 5/2001 | Favret, Jr. | |

(Continued)

FOREIGN PATENT DOCUMENTS

| | | |
|---|---|---|
| GB | 1375468 | 11/1974 |
| WO | 92/19352 | 11/1992 |
| WO | 2013/109345 A1 | 7/2013 |

*Primary Examiner* — Thomas M Lithgow
(74) *Attorney, Agent, or Firm* — Hauptman Ham, LLP

(57) ABSTRACT

A method to remove oil from an oily water stream includes the step of pressure controlling a release of dissolved gases from the stream as the stream passes through two or more stages of gas flotation treatment. The operating pressure of the first stage of flotation treatment is purposefully reduced relative to that of an upstream unit so that a certain controlled percent volume of dissolved gases is released. The operating pressure of the second stage of flotation treatment is then purposefully reduced relative to that of the first stage so that another controlled percent volume of dissolved gases is released. Any subsequent flotation treatment stage is at a lower operating pressure than that of the previous stage so that the subsequent treatment stage releases a controlled percent volume of dissolved gases. By controlling the operating pressure in this way, overall separation performance is improved.

19 Claims, 7 Drawing Sheets

(51) Int. Cl.
  *B03D 1/04*   (2006.01)
  *B03D 1/14*   (2006.01)
  *C02F 1/20*   (2006.01)
  *C02F 1/40*   (2006.01)
  C02F 1/38   (2006.01)
  C02F 101/32   (2006.01)

(56) References Cited

U.S. PATENT DOCUMENTS

| | | | |
|---|---|---|---|
| 6,949,195 B2 * | 9/2005 | Morse | B01F 3/0446 |
| | | | 210/199 |
| 7,157,007 B2 | 1/2007 | Frankiewicz et al. | |
| 7,638,062 B2 | 12/2009 | Movafaghian et al. | |
| 8,110,024 B2 | 2/2012 | Folkvang | |
| 8,277,547 B2 | 10/2012 | Folkvang | |
| 8,425,777 B2 | 4/2013 | Folkvang | |
| 8,734,577 B2 * | 5/2014 | Naess | B01D 17/0211 |
| | | | 96/174 |
| 10,086,315 B2 * | 10/2018 | Richerand, Sr. | B01D 17/0205 |
| 2002/0077373 A1 * | 6/2002 | Hudson | B01F 7/00816 |
| | | | 516/98 |
| 2003/0085185 A1 * | 5/2003 | Kouba | B01D 17/0208 |
| | | | 210/787 |
| 2012/0145642 A1 | 6/2012 | Bozak | |
| 2012/0168385 A1 * | 7/2012 | Anderson | B03D 1/1431 |
| | | | 210/703 |
| 2013/0292340 A1 | 11/2013 | Lee et al. | |
| 2014/0209176 A1 | 7/2014 | Lee et al. | |

\* cited by examiner

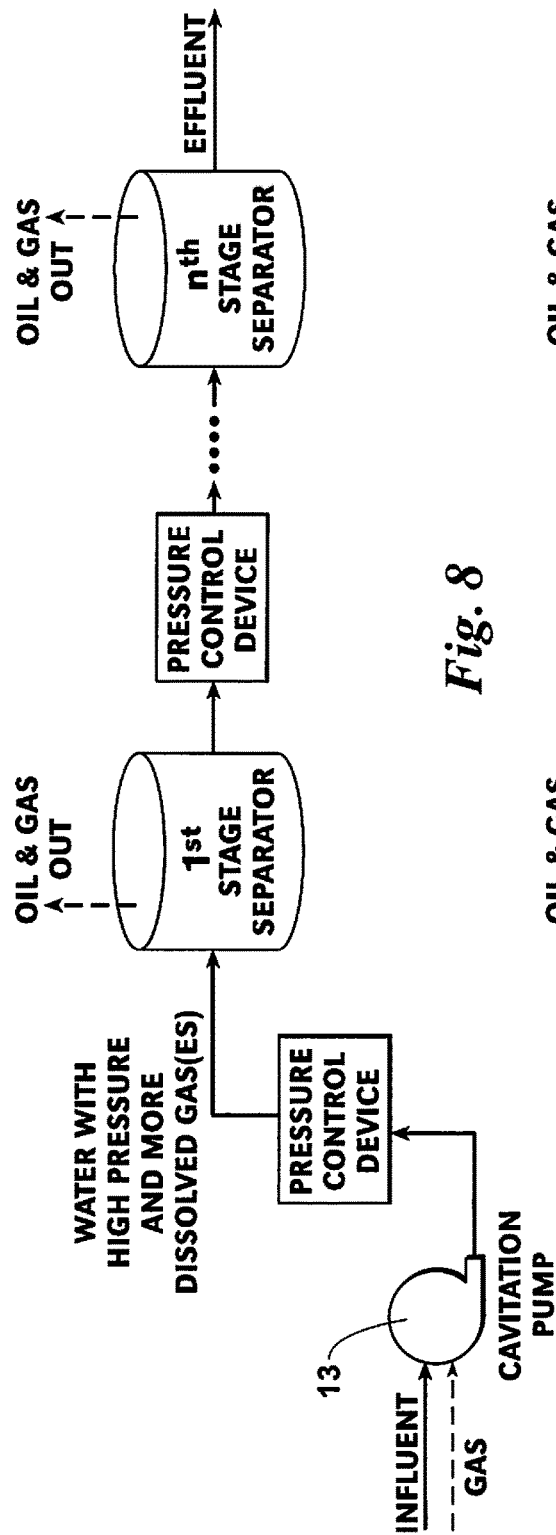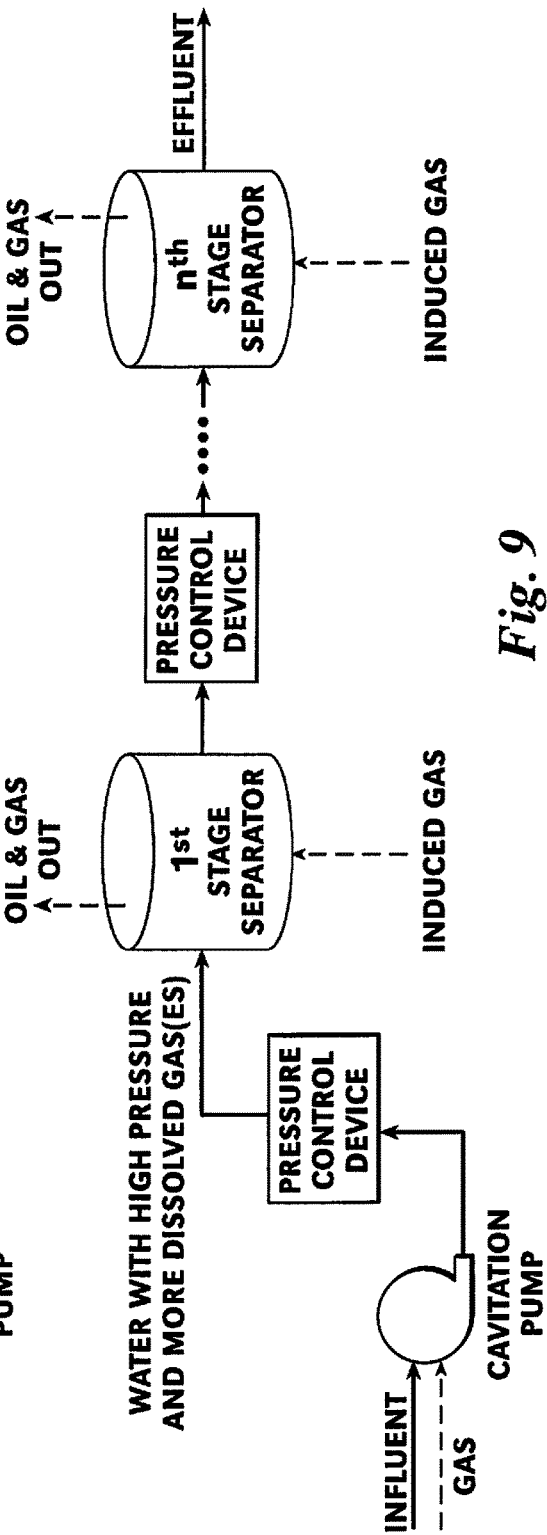

PRESSURE CONTROLLED GAS FLOTATION

BACKGROUND

This disclosure relates to gas flotation equipment and methods used to separate oil from an oily water stream.

Gas flotation equipment and methods use small gas bubbles to "float" oil droplets out of an oily water stream. The gas bubbles can be originally dissolved in one or both phases of the stream (water, oil) and can be added to the oily water stream. Sometimes, the oily water stream passes through two or more stages of this gas flotation treatment. The stages can be housed in the same vessel or in separate vessels. Each stage typically includes an oil outlet, water outlet, and gas outlet, with almost all of the dissolved gas in the oily water stream being released in the first stage.

Within each stage of treatment, the separation efficiency of the oil droplets and the gas bubbles is determined, in part, by the gas bubble diameter relative to the oil droplet diameter. Generally speaking, the smaller the gas bubble diameter, the better the separation of the oil droplets from the oily water stream.

A problem with multi-stage gas flotation treatment is almost the entire the pressure drop occurs between the upstream unit that provides the oily water stream and the first stage flotation separator, leaving little room available for large operation pressure differentials to occur between this flotation separator and later stage flotation separator(s). This first operation pressure differential causes almost all of the dissolved gases are released from the water and oil phases of the stream in the first stage flotation separator.

As the oily water stream passes to the second stage flotation separator, the (not all that much) lower operation pressure of this second separator is relatively ineffective in releasing any remaining dissolved gases trapped in the water or in the remaining oil droplets. The end result is declining separation performance from one stage of flotation treatment to the next, with the first stage of flotation treatment having the best performance.

SUMMARY

An embodiment of a method to remove oil from an oily water stream includes the step of pressure controlling the release of gases across all stages of flotation treatment so that a controlled percent volume of dissolved gases is released within each stage. The operating pressure of the first stage of the gas flotation treatment is reduced relative to that of upstream unit so that a certain volume percentage of the dissolved gases is released from the oily water feed stream. The operating pressure of the second stage of gas flotation treatment is reduced relative to that of the first stage so that a controlled percent volume of dissolved gases is released. Any subsequent gas flotation treatment stage is at a lower operating pressure than that of the previous gas flotation stage, with the lower operating pressures being set so that the percent volume of dissolved gases being released in each stage is similar as that of the previous stages.

By reducing the operating pressure across the treatment stages in this way, the dissolved gases in the water phase of the stream and in the oil phase of the stream are released in a controlled manner across all of the treatment stages, thereby improving overall oil separation performance.

BRIEF DESCRIPTION OF THE DRAWINGS

FIG. 8 is a schematic of another preferred embodiment of the system and method. A cavitation pump is used to increase the pressure and the amount of dissolved gases in the oily water stream.

FIG. 9 is a variation on the system and method of FIG. 8. Induced gas is introduced into one or more of the stages.

NUMBERING AND ELEMENTS USED IN THE DRAWINGS

Figure 1:
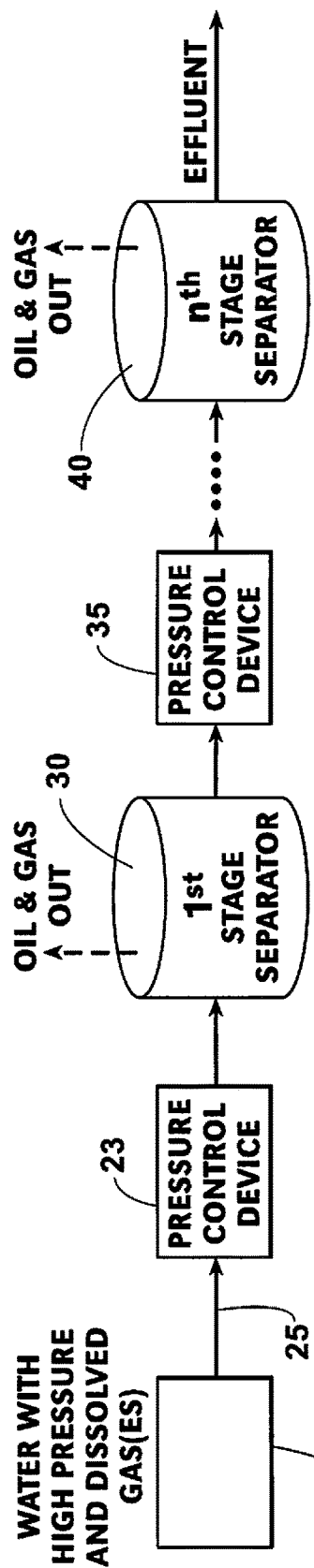
FIG. 1 is a schematic of a system and method to pressure control the release of dissolved gases in a flotation process having two or more flotation treatment stages. Operating pressure is controlled at each flotation stage so that a controlled volume of gases dissolved in the water phase and oil phase is released within each stage.
Figure 2:
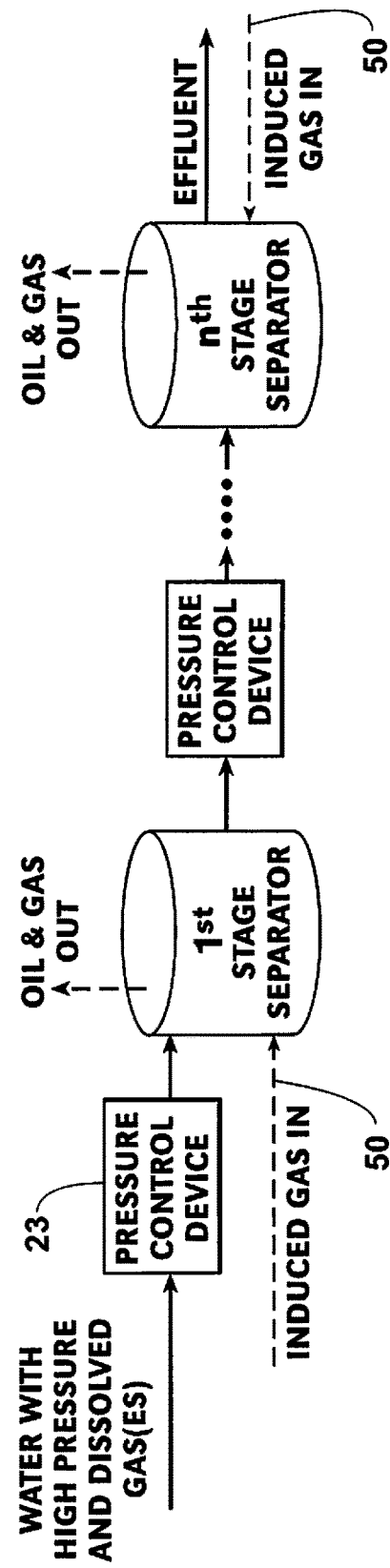
FIG. 2 is a variation on the system and method of FIG. 1. Induced gas is introduced into one or more of the stages.
Figure 3:
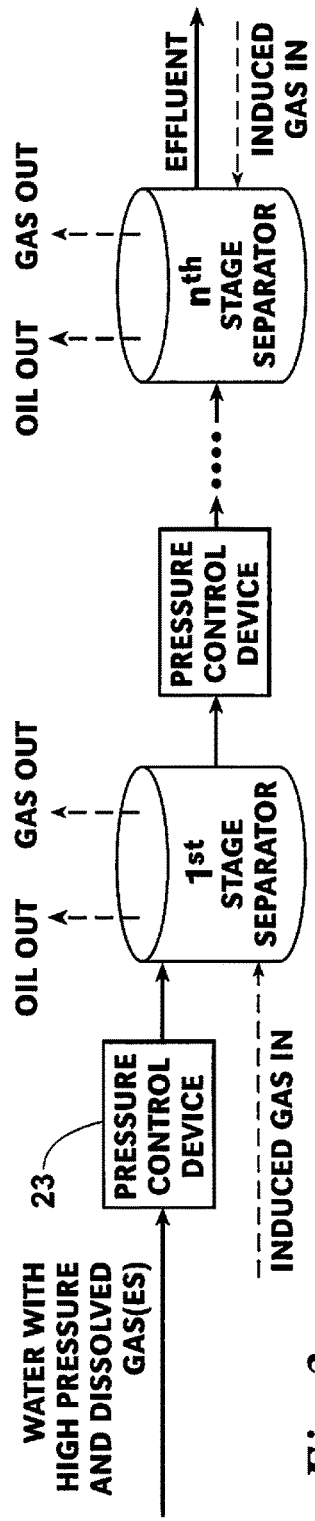
FIG. 3 is a variation on the system and method of FIG. 3. Within each stage, oil and gas are vented through different outlets.

10 System or method
13 Cavitation pump
15 Pump
17 Compressor or blower
20 Upstream unit (oily water stream source)
25 Oily water stream
30 First stage flotation separator
35 Pressure control device
40 Second or $n^{th}$ stage flotation separator
50 Induced gas

DEFINITIONS

Oily water stream—an impaired water stream containing some percent volume of oil and dissolved gases in the water phase, oil phase, or in both the water and oil phases of the stream. Examples of oily water streams include but are not limited to produced waters, oily waste waters, and machining process oily waters.

Pressure drop or differential—a difference in pressure occurring between an upstream unit providing an oily water stream to a first flotation separator or stage or occurring between an upstream and downstream separator (or stage). A controlled pressure drop can be accomplished using a pressure control device.

Pressure control device—a device that creates a pressure drop or differential to achieve an intended operating pressure. Examples include but are not limited to valves (orifices), oil coalescing media, hydrocyclones (with or without an oil reject stream), or some combination of valves, media, and hydrocyclones.

Operating pressure—a pressure of the oily water stream within an upstream unit or flotation separator or stage. By way of example, the difference between the operating pressure of an upstream flotation separator and the operating pressure of the immediate downstream flotation separator is the pressure drop.

Controlled release—an intentional operating pressure for a flotation separator or stage at which a predetermined or targeted (controlled percent) volume of dissolved gases is released in the flotation stage relative to the total volume of water being treated in the flotation stage. The controlled percent volume can be a same or similar volume as that provided by the controlled release of another flotation stage or it could be a different volume than that other stage.

Upstream unit—a vessel or apparatus that provides an oily water stream to a downstream vessel or apparatus either for initial gas flotation treatment (e.g. immediately upstream of a first flotation separator) or additional gas flotation treatment (e.g. immediately upstream of an $n^{th}$ stage flotation separator).

Flotation separator—a vessel or apparatus arranged for gas flotation treatment of an oily water stream or a flotation stage arranged within the vessel or apparatus. A flotation separator or stage can be an upstream unit relative to a subsequent downstream flotation separator.

DETAILED DESCRIPTION OF PREFERRED EMBODIMENTS

Referring to the drawings, the system and method described here can be used in gas flotation systems in which two or more stages of gas flotation reside within the same separator vessel, or it can be used in gas flotation systems in which one or more of the stages reside within separate separator vessels. The separate vessels can be single stage or multi-stage vessels. Example systems and vessels in which the method can be practiced include, but are not limited to, those disclosed by Frankiewicz et al. (U.S. Pat. No. 7,157,007 B2), Movafaghian et al. (U.S. Pat. No. 7,638,062 B2), and Folkvang (U.S. Pat. No. 8,110,024 B2, U.S. Pat. No. 8,277,547 B2, U.S. Pat. No. 8,425,777 B2, WO 2013/109345 A1), the contents of which are hereby incorporated by reference.

The systems and vessels described herein are configured so that operation pressure is controlled at each stage of flotation treatment so that every stage releases a controlled volume of dissolved gas from at least one of the water phase and oil phase. To accomplish this controlled gas release, a desired cascading operating pressure profile is created using a pressure control device such as valves, oil coalescing media, hydrocyclones (with or without an oil reject stream), or some combination of valves, media, and hydrocyclones.

The cascading pressure profile sets the operating pressure of the first stage flotation separator 30 below that of the upstream unit or source 20 providing an oily water feed stream 25 but at a pressure that releases a desired controlled percent volume of dissolved gases from the stream 25. The profile then sets the operating pressure of the second stage flotation separator 40 lower than that of the first stage 30 and at a pressure that releases a controlled percent volume of dissolved gases. The controlled percent volume can be a same or similar volume in each stage 30, 40, or it can be a different volume. For example, in a three-stage system designed for similar controlled percent volumes across the stages, $$V_{1@P_1} \cong V_{2@P_1} \cong V_{3@P_3}, Ps > P_1 > P_2 > P_3 \quad \text{(Eq. 1)}$$

where V is the controlled percent volume of dissolved gases being released from the water or oil phase of the oily water stream relative to the volume of water being treated in the stage; P is the controlled operating pressure of the separator or separator stage; and S is the immediate upstream unit providing the oily water feed stream to the first stage flotation separator 13.

In general terms, relative to the stage flotation separators, $$V_{N-1@P_{N-1}} \cong V_{N@P_N}, P_{N-1} > P_N, N \geq 2 \quad \text{(Eq. 2)}$$

where P is a controlled operating pressure that releases a similar controlled percent volume V of dissolved gases from one stage flotation separator to the next. Note that the controlled operating pressure P of a stage can be set so a different controlled percent volume V of dissolved gases is released relative to that of another stage. By reducing the operating pressure $P_N$ of the Nth stage flotation separator in a controlled way relative to the controlled operating pressure $P_{N-1}$ of the immediate upstream (N−1)th stage flotation separator, a similar controlled percent volume V of the gas bubbles originally dissolved in the oily water stream are further released from the water phase, oil phase, or from both phases of the stream as that released in the Nth stage.

The reduced operating pressure of each stage facilitates the release of dissolved gases in the oil phase of the stream, with the oil droplets increasing in size as the gases are released:

$$d_{b_N} > d_{b_{N-1}} \quad \text{(Eq. 3)}$$

For example, in one embodiment the controlled pressure release results in the oil droplet size increasing (and becoming lighter) relative to the first stage as dissolved gases are released from the oil phase of the stream:

$$\Delta d_{b_N} \cong NI_1 \quad \text{(Eq. 4)}$$

where N is the treatment stage and I is the percent increase in the first treatment stage (N=1).

Process modeling can be used so that the controlled operating pressure of each stage, and therefore the controlled percent volume of gas being released, is optimized in order for the overall oil removal efficiency to be optimized. For example, the operating pressure of each stage can be designed so that the total volume of released gas per volume of water treated by the stage meets a predetermined level or percent (e.g., more than 0.2%, more than 0.5%, more than 1%, more than 3%). The controlled, cascading pressure profile is one appropriate for the application. For example, and by way of illustration, in a preferred embodiment $P_N = 0.5 P_{N-1}$. In applications in which the pressure Ps of the incoming oily stream 25 is not high enough, pressure increasing equipment such as a cavitation pump 13 or a pump 15 and a gas compressor 17 can be used to increase the pressure and the amount of dissolved gases in the oily water stream 25.

The dissolved gases can include $CH_4$, $CO_2$, $C_2H_6$, $H_2S$, or $N_2$, or some composition thereof. The same is true of any induced gas 50 which is introduced into one or more of the stages 30, 40. The composition of the induced gas 50 can be different from that of the dissolved gases. In this way, the induced gas stream decreases the partial pressure of the dissolved gases and, therefore, a greater volume of dissolved gases can release from the water and/or oil phase of the oily water stream. For example, when nitrogen is used as the induced gas the partial pressure of $CH_4$ could be almost zero in the last or later flotation treatment stages.

The small gas bubbles (dissolved gases) and big gas bubbles (induced gases) interact with the small oil droplets differently. With optimized pressure control to release a certain percentage of dissolved gases, a large amount of small dissolved gas bubbles is released at each stage of the flotation separator. Generally speaking, it is easier for the small dissolved gas bubbles to attach to the (typically) similar-sized oil droplets.

In contrast, the induced gas bubbles are typically much larger than the dissolved gas bubbles (and oil droplets), making it more difficult for the large induced gas bubbles to attach to the much smaller oil droplets. The reasons for this difficulty include: (1) for a certain volume of gas, large gas bubbles do not have a very large surface area; (2) the turbulence around the bigger gas bubbles is stronger than that around the smaller gas bubbles; and (3) when a small oil droplet does attach to a much larger gas bubble, there might not be enough molecules of oil to spread around the big gas bubble.

By way of an example, assume that after hydrocyclone pretreatment to remove the big oil droplets from an oily water stream, a leftover oil droplet has diameter 10 μm, with volume of $4/3\pi 5^3 = 532.6$ μm$^3$. For an induced gas bubble with diameter 200 μm, the surface area of the gas bubble is $4\pi 100^3 = 125664$ μm$^2$. However, the oil layer volume (thickness) relative to this gas bubble surface area is only $532.6/125664 = 0.004$ μm $= 40$ angstrom, which is approaching the single molecule limitation of oil. Therefore, it is difficult for the induced gas bubble to attach itself to the leftover oil droplet.

Figure 4:
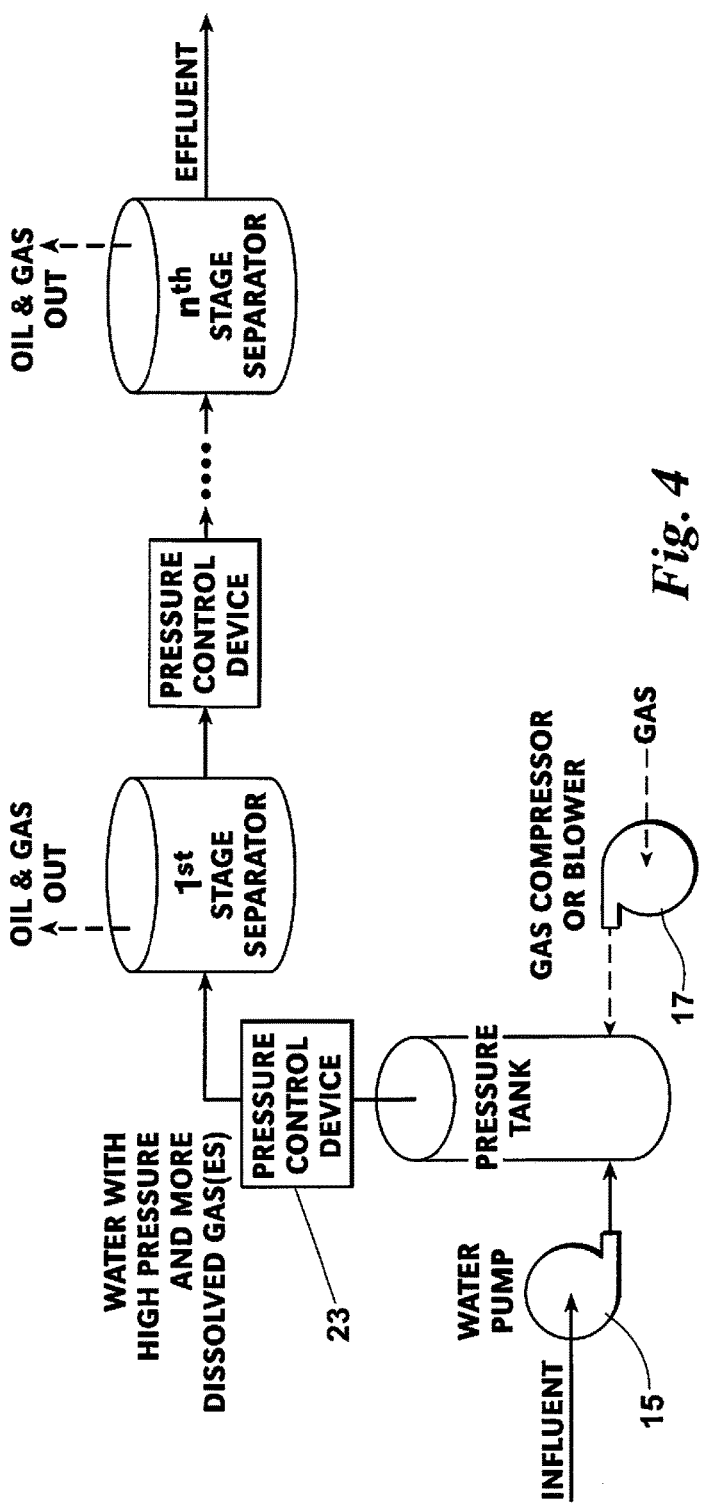
FIG. 4 is a schematic of another preferred embodiment of the system and method. A pump and a gas compressor are used to increase the pressure and the amount of dissolved gases in the oily water stream.
Figure 5:
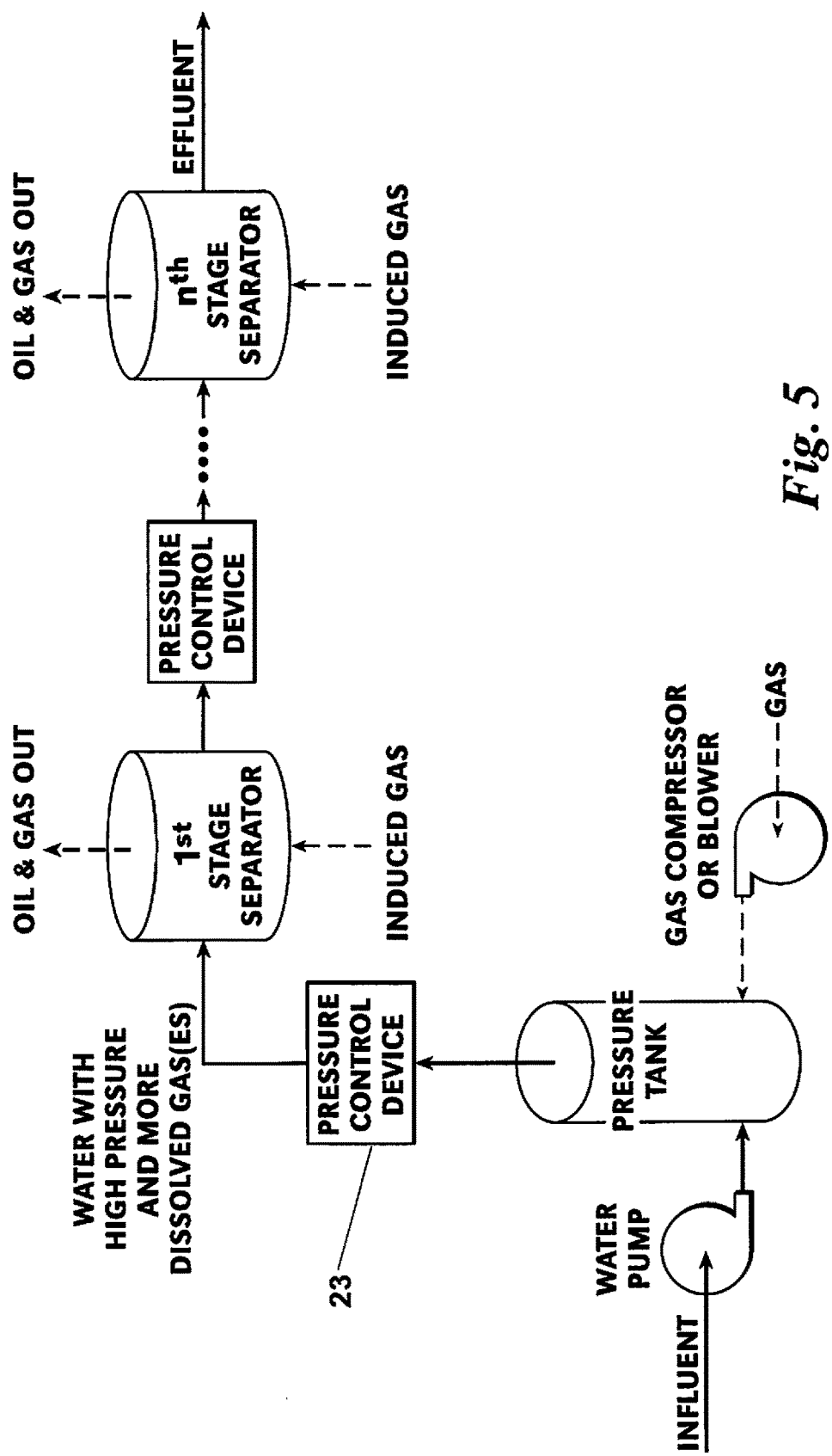
FIG. 5 is a variation on the system and method of FIG. 4. Induced gas is introduced into one or more of the stages.
Figure 6:
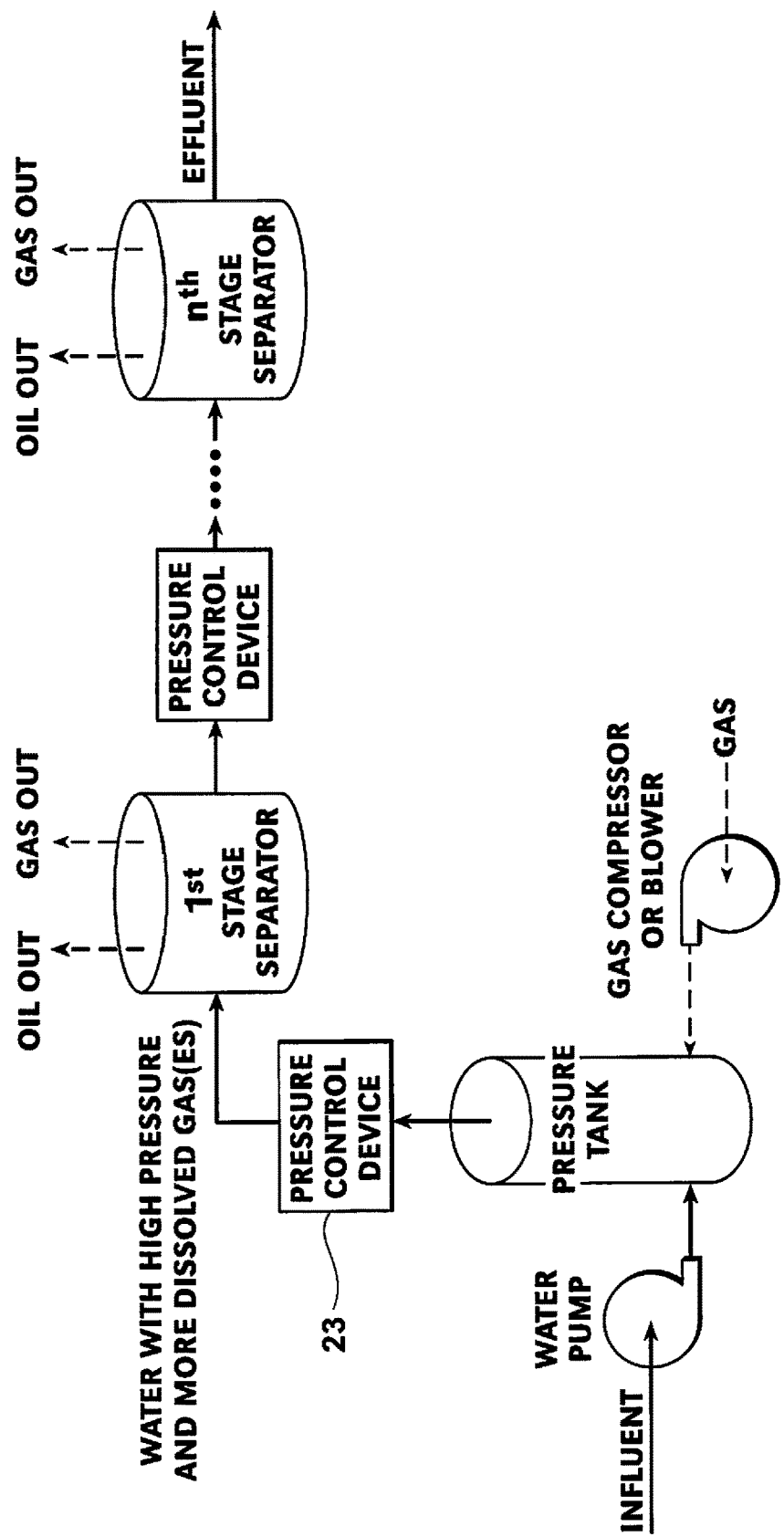
FIG. 6 is another variation on the system and method of FIG. 4. Within each stage, oil and gas are vented through different outlets. No induced gas is used.
Figure 7:
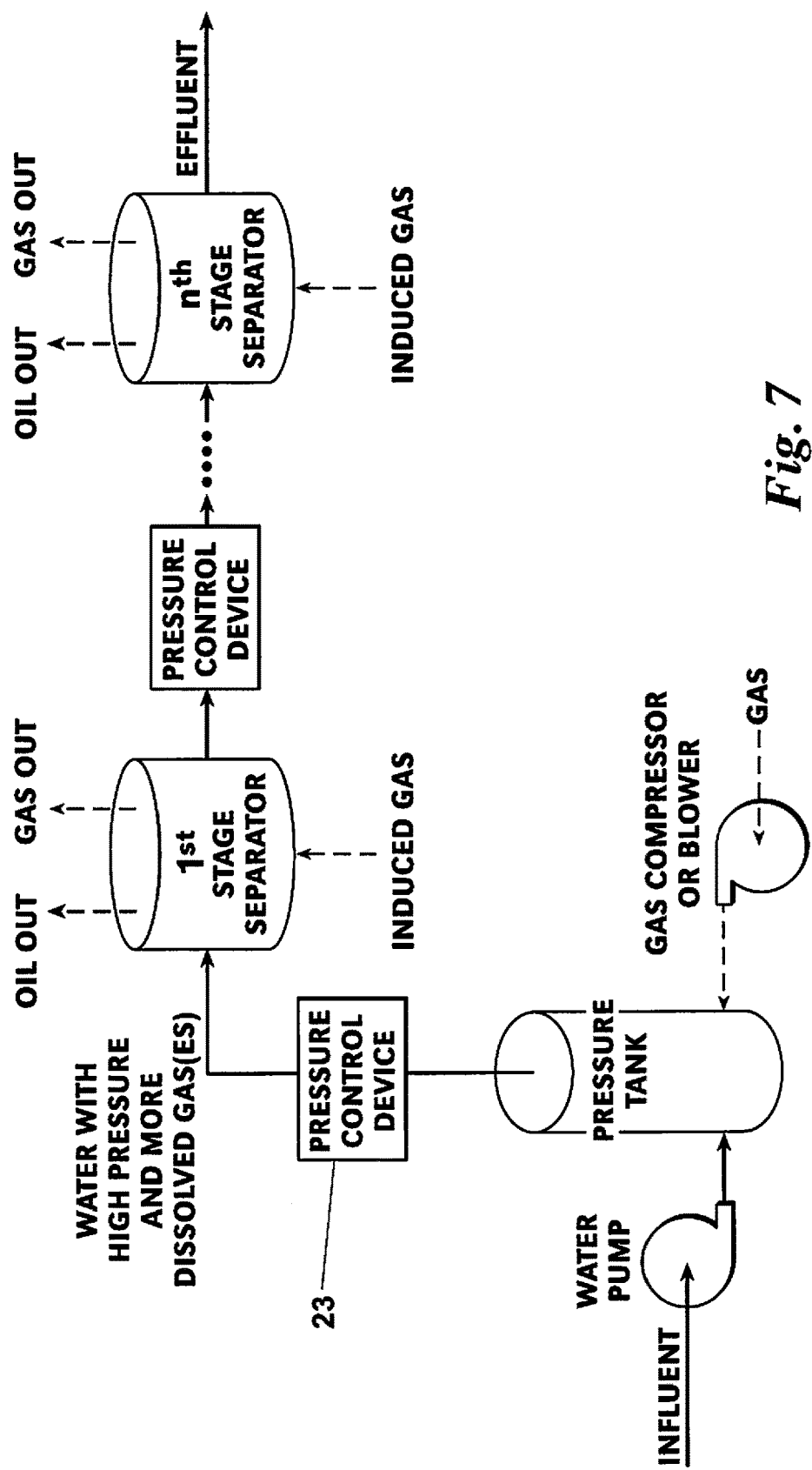
FIG. 7 is a variation on the system and method of FIG. 6. Induced gas is introduced into one or more of the stages.
Figure 10:
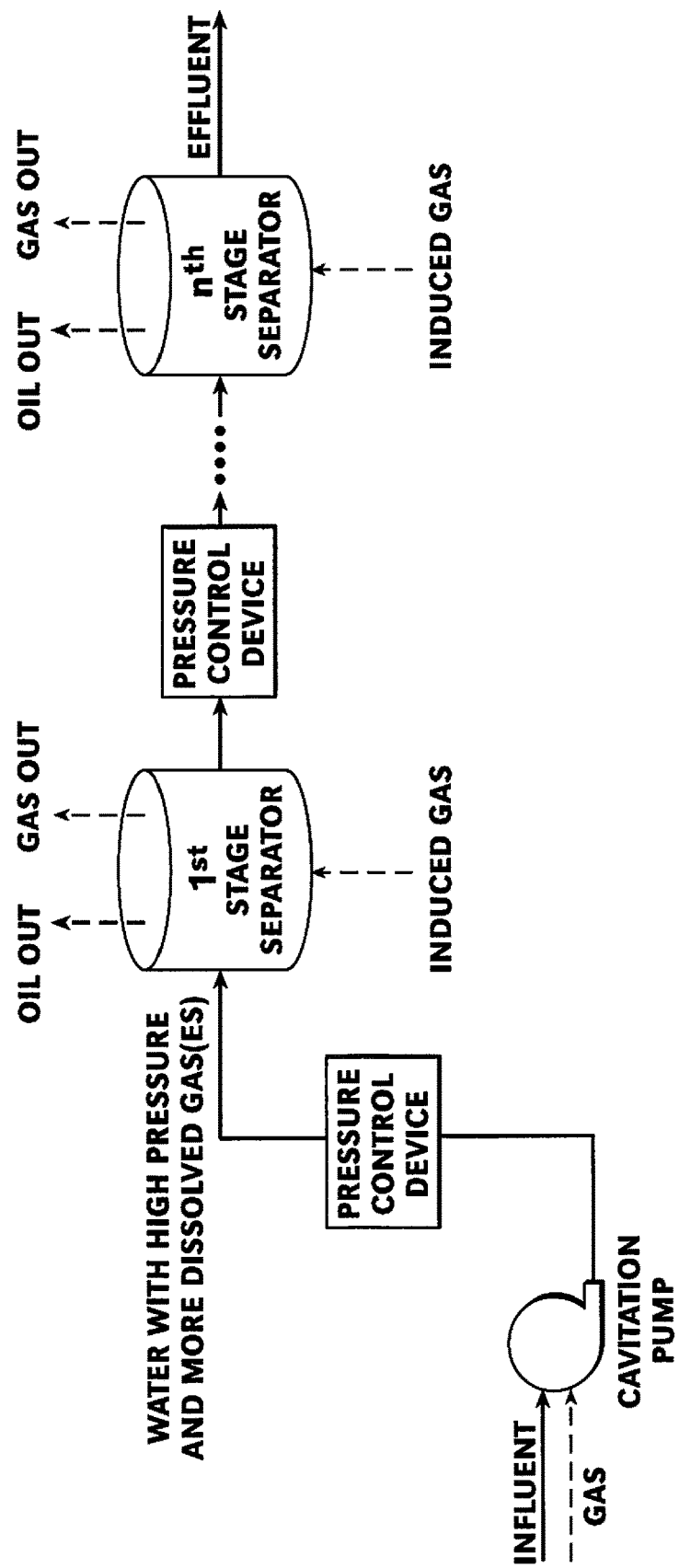
FIG. 10 is a variation on the system and method of FIG. 9. With each stage, oil and gas are vented through different outlets.

Oil can be removed from the separators without induced gas such as shown in FIGS. 1, 4, 6, and 8. However, the water detention time in these separators is long because the dissolved gas bubbles are small and the rising velocity of oil and small gas bubble aggregates is slow. In order to reduce the detention time in these separators, or decrease the volume of these separators, induced gas can be applied. Induced gas can create big gas bubbles which rise faster. Because, there is a low pressure zone at the tail when big gas bubbles rise, the bubble can trap some oil and small gas bubble aggregates and cause them to rise together at faster velocity.

The above embodiments are examples of a system and method to pressure control the release of gas in a gas flotation separator or stage. The following claims define the scope of the inventive system and method and include the full range of equivalents to the recited elements.

What is claimed:

1. A method of removing oil from an oily water stream by passing the oily water stream through at least two stages of treatment, wherein within each stage oil droplets are floated out of the oily water stream with the help of gas bubbles originally dissolved in a water phase, oil phase, or in both the water and oil phases, the method comprising the steps of:
   pressure controlling a release of a volume of dissolved gases contained within the oily water stream by reducing an operating pressure of a first stage flotation separator below that of the oily water stream in an immediate upstream unit; and
   pressure controlling a release of another volume of dissolved gases contained within the oily water stream by reducing an operating pressure of a second stage flotation separator below that of the first stage flotation separator;
   wherein the volume of dissolved gases being released from the oily water stream in each stage flotation separator is a controlled percent volume relative to a total volume of water treated in the stage flotation separator, and the method further comprises,
   prior to pressure controlling the release of the volume, increasing the operating pressure and amount of dissolved gases of the oily water stream prior to it entering the first stage flotation separator by providing the oily water stream to a pressure tank;
   adding induced gas bubbles to the first stage separator; and
   entraining the oil and released dissolved gases in a rising path of the induced gas bubbles in the first stage flotation separator.

2. A method according to claim 1 wherein the first and second stage flotation separators reside within a same vessel.

3. A method according to claim 1 further comprising the step of pressure controlling a release of yet another volume of dissolved gases contained within the oily water stream by reducing an operating pressure of a nth stage flotation separator below that of the (n−1)th stage flotation separator, wherein n=3 and wherein the volume of dissolved gases being released in the nth stage flotation separator is a controlled percent volume.

4. A method according to claim 3 wherein the volume of dissolved gases released in the nth stage flotation separator is substantially the same as that released from at least one of the (n−1)th stage flotation separators.

5. A method according to claim 1 wherein a portion of the volume of dissolved gases being released in a stage flotation separator is from a water phase of the oily water stream.

6. A method according to claim 1 wherein a portion of the volume of dissolved gases being released in a stage flotation separator is from an oil phase of the oily water stream.

7. A method according to claim 1 wherein the volume of dissolved gasses being released in a stage flotation separator includes one or more gasses selected from the group consisting of $CH_4$, $CO_2$, $C_2H_5$, $H_2S$, and $N_2$.

8. A method according to claim 1 wherein the total volume of dissolved gases being released in each stage flotation separator is more than 0.2% per volume of water treated.

9. A method according to claim 8 wherein the total volume of dissolved gases being released in each stage flotation separator is more than 0.5% per volume of water treated.

10. A method according to claim 9 wherein the total volume of dissolved gases being released in each stage flotation separator is more than 1% per volume of water treated.

11. A method according to claim 10 wherein the total volume of dissolved gases being released in each stage flotation separator is more than 3% per volume of water treated.

12. A method according to claim 1 wherein the induced gas includes one or more gases selected from the group consisting of $CH_4$, $CO_2$, $C_2H_5$, $H_2S$, and $N_2$.

13. A method according to claim 1 further comprising the step of reducing a partial pressure of at least one of the dissolved gases in the oily water stream.

14. A method according to claim 13 wherein the step of reducing the partial pressure includes inducing a gas into at least one of the stage flotation reactors, the induced gas having a different composition than the dissolved gases in the oily water stream.

15. A method according to claim 1 wherein at least one of the pressure controlling steps includes an orifice to control the operating pressure of at least one of the stage flotation separators.

16. A method according to claim 1 wherein at least one of the pressure controlling steps includes an oil coalescing media to control the operating pressure of at least one of the stage flotation separators.

17. A method of claim 1 wherein at least one of the pressure controlling steps includes a hydrocyclone to control the operating pressure of at least one of the stage flotation separators.

18. A method according to claim 17 wherein the hydrocyclone includes an oil outlet.

19. A method according to claim 3, further comprising adding induced gas bubbles to the nth stage flotation separator.

* * * * *